Patented Dec. 19, 1922.

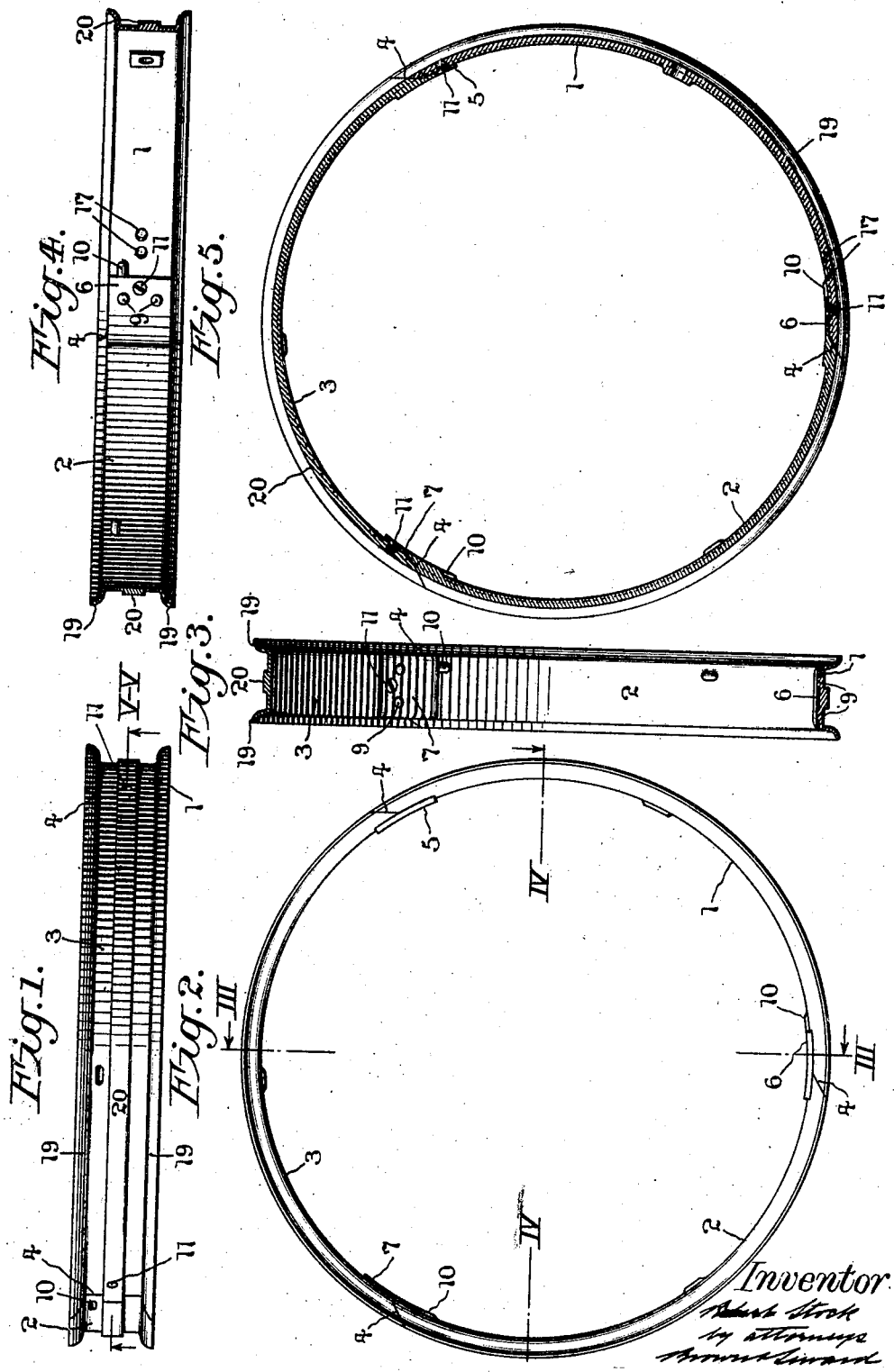

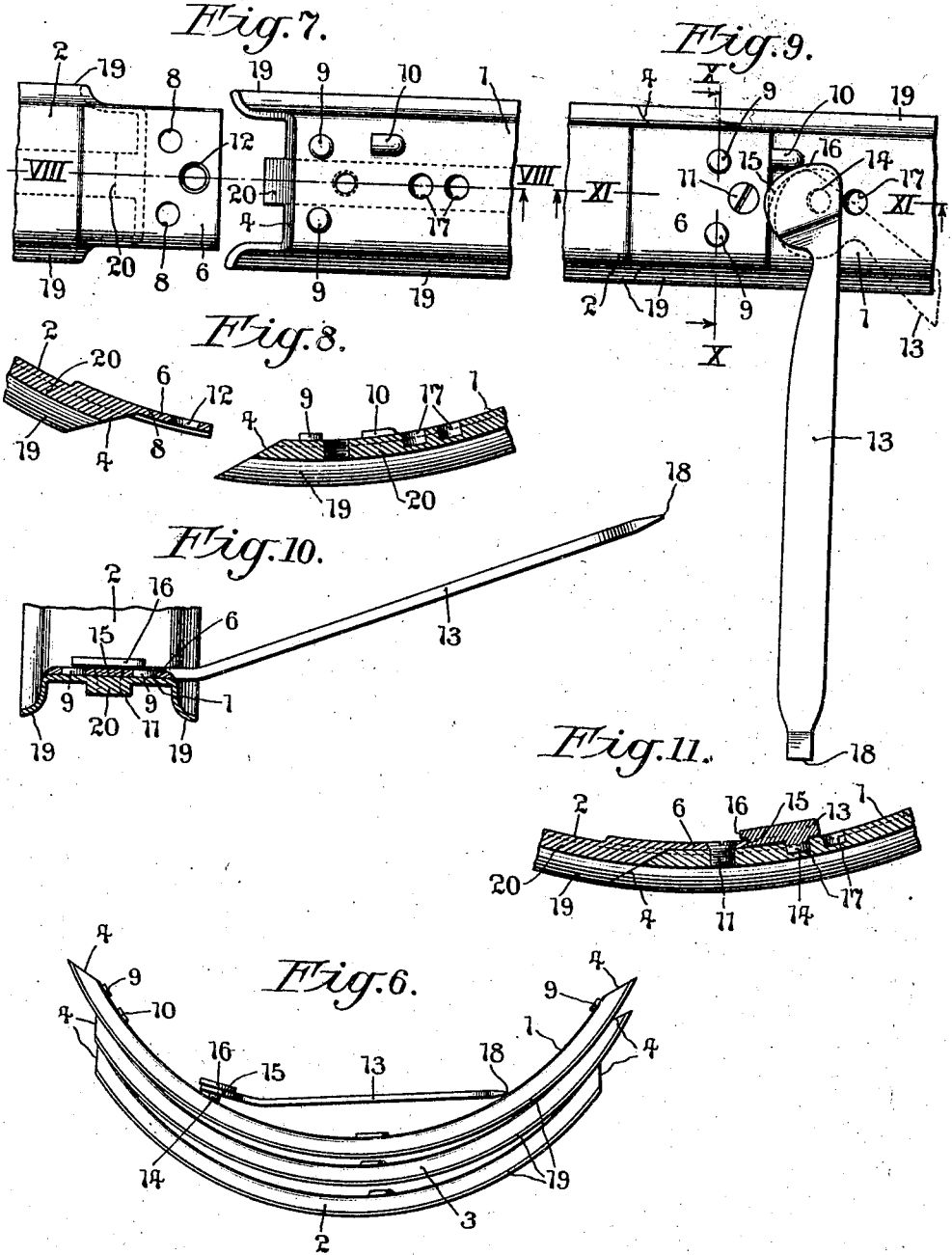

1,439,275

UNITED STATES PATENT OFFICE.

ROBERT STOCK, OF SANDUSKY, OHIO.

SECTIONAL VEHICLE-WHEEL RIM.

Application filed September 22, 1919. Serial No. 325,363.

*To all whom it may concern:*

Be it known that I, ROBERT STOCK, a citizen of the United States, and resident of the city of Sandusky, in the county of Erie and State of Ohio, have invented a new and useful Improvement in Sectional Vehicle-Wheel Rims, of which the following is a specification.

This invention relates to vehicle wheel rims of the type designed to carry pneumatic or other resilient tires and has for its object to provide a knock-down rim which is divided transversely in sections, which are arranged to be rigidly secured together, thus facilitating the application and removal of the tires.

Another object is to provide a sectional rim having the abutting ends of each of the sections beveled to afford a support for the sections and allowing the ends to be readily connected.

Another object is to provide each of the sections with a longitudinal rib located on the outer periphery intermediate the flanges for strengthening the sections, and giving an extended support for the rim; certain of the sections having means adapted to engage the adjacent section for securing it thereto.

Another object is to provide a sectional rim having a separate means adapted to engage the sections for moving them longitudinally into position to form the rim.

A still further object is to provide certain improvements in the form, construction and arrangement of the several elements, whereby the above named and other objects may be effectively attained.

A practical embodiment of my invention is represented in the accompanying drawings in which, Fig. 1 represents a plan view of my sectional rim assembled as in use.

Fig. 2 represents a side elevation of the same.

Fig. 3 represents a vertical section taken in the plane of the line III—III of Fig. 2, looking in the direction of the arrows.

Fig. 4 represents a horizontal section taken in the plane of the line IV—IV of Fig. 2, looking in the direction of the arrows.

Fig. 5 represents a longitudinal section taken in the plane of the line V—V of Fig. 1, looking in the direction of the arrows.

Fig. 6 represents a side elevation of the sections and the means for manipulating the same, packed for convenience in carrying or for shipment.

Fig. 7 represents a detail plan view, on an enlarged scale, of the inner faces of the adjacent ends of two sections of the rim in position to be connected.

Fig. 8 represents a longitudinal section taken in the plane of the line VIII—VIII of Fig. 7, looking in the direction of the arrows.

Fig. 9 represents a detail plan view, similar to Fig. 7, with the adjacent end of the sections connected and the means of manipulating the ends ready to be removed.

Fig. 10 represents a transverse section taken in the plane of the line X—X of Fig. 9, looking in the direction of the arrows, and Fig. 11 represents a longitudinal section taken in the plane of the line XI—XI of Fig. 9, looking in the direction of the arrows.

The tire rim in the form shown in the drawings is divided transversely into three sections denoted by 1, 2 and 3, the ends of which sections are beveled at 4 to coact with its adjacent section. The section 3 is provided along its inner periphery with an extended portion 5 and the section 2 with extended portions 6, 7. Each of the extended portions is shown as being formed integral with the body of the rim, but they may be formed of separate pieces secured to the rim by any well known and approved means. These extended portions are also offset from the body of the rim and serve to strengthen the joint between the adjacent sections, as well as, space the rim from the felly of the wheel (not shown). Each of the extended portions is provided with holes 8 arranged to receive pins 9 carried by the adjacent sections to lock the sections against longitudinal displacement. In addition to this locking means, lugs 10 are formed on the sections so as to be engaged by the end of the extended portions. To secure the sections in interlocked engagement, I provide a screw 11 engaging a hole 12 in the extended portions and threaded into the body of the rim section immediately beneath, as shown in Figs. 3, 4, 5, 9 and 11. To assemble the sections in position, the section 1 may be interlocked with the section 3 and the extended portion 5 secured to the section 1 by its screw

11; the section 2 may now be secured to the section 3 by the extended portion 7 being screwed thereto.

When the sections are interlocked in the manner above described, the end of the section 2 carrying the extended portion 6 will overlap the section 1 and it will be necessary to expand these sections in order to get the extended portion 6 to engage its pins 9. The expanding of the ends of the sections 1 and 2 is accomplished by means of a tool 13 having a stud 14 and a cam 15 provided with a lip 16. The stud 14 is arranged to enter either of the holes 17 in the rim section 1, and the cam 15 adapted to engage the extended portion 6. Thus it will be seen that as the tool is oscillated on its stud 14, the cam 15 will engage the extended portion 6 and force it rearwardly until it springs back of the lug 10, which will hold it until the screw 11 is inserted. The lip 16 on the cam 15 tends to hold the extended portion 6 from slipping from the cam face while being manipulated. The free end of the tool 13 may be fashioned into a screw driver and tire remover 18 as shown in Figs. 6, 9, and 10.

Each section of the rim is provided with flanges 19 and a longitudinal rib 20 interposed between the flanges along its outer periphery, thus serving to stiffen the section throughout its length. Furthermore, the longitudinal rib 20 together with the flanges 19 support the side walls of the tire, form a bed for the head of the tire, and prevent the flanges from cutting the walls of the tire when deflated.

While I have shown and described a rim having three separable sections, I wish it understood that the rim may be made in any number of sections.

It is obvious that various changes may be resorted to in the form, construction and arrangement of the several parts without departing from the spirit and scope of my invention; and hence I do not intend to be limited to the details herein shown and described, except as they may be included in the claim.

What I claim is:

A knock-down rim for tires divided transversely into a plurality of separable rim sections, one of the ends of two adjacent sections being extended to overlap and engage the adjacent section, means on the adjacent section arranged to interlock the extended portion, a lug on the adjacent section, a second means on the adjacent section for engagement of a device arranged to coact with the extended portion to expand the meeting ends into interlocking engagement, and means engaging the extended portion and the adjacent section for securing the rim sections together.

In testimony, that I claim the foregoing as my invention, I have signed my name this 18th day of September, 1919.

ROBERT STOCK.